(12) United States Patent  (10) Patent No.: US 6,565,065 B1
Palmer  (45) Date of Patent: May 20, 2003

(54) DISC VALVE ADAPTOR

(75) Inventor: Robert Palmer, Hopatcong, NJ (US)

(73) Assignee: Straham Valves, Inc., Florham Park, NJ (US)

( * ) Notice: Subject to any disclaimer, the term of this patent is extended or adjusted under 35 U.S.C. 154(b) by 0 days.

(21) Appl. No.: 09/991,018

(22) Filed: Nov. 16, 2001

(51) Int. Cl.⁷ .............................. F16K 25/00
(52) U.S. Cl. ................ 251/186; 251/191; 251/264; 251/357
(58) Field of Search .................. 251/176, 186, 251/191, 264, 357

(56) References Cited

U.S. PATENT DOCUMENTS

| 2,574,054 | A | | 11/1951 | Miller | |
| 2,839,265 | A | * | 6/1958 | Hobbs | 251/191 |
| 2,918,078 | A | | 12/1959 | Cummings | |
| 3,211,418 | A | | 10/1965 | Lohr | |
| 3,211,419 | A | * | 10/1965 | Lohr | 251/191 |
| 3,612,479 | A | * | 10/1971 | Smith, Jr. | 251/191 |
| 3,804,365 | A | * | 4/1974 | Fetterolf et al. | 251/186 |
| 4,073,308 | A | * | 2/1978 | Stith, Jr. | 251/191 |
| 4,815,698 | A | * | 3/1989 | Palmer | 251/176 |

OTHER PUBLICATIONS

Sung IL Valve Industry Co., Ltd., Tank Bottom Flush Valve (Upper Type), Model STBF–U. 2 sheets drawing (date unknown).
Key Bellevilles, Inc., Live Loading of Flange Stud Bolts and Live Loading of Valve Stem Packing Glands to prevent leakage problems (catalog), date unknown.

* cited by examiner

Primary Examiner—Ehud Gartenberg
Assistant Examiner—John Bastianelli
(74) Attorney, Agent, or Firm—Carella Byrne Bain Gilfillan, et al.; John G. Gilfillan, III; William Squire

(57) ABSTRACT

An adaptor is for a rising disc valve which has a handle for rotating a stem in a housing bore having a shoulder and which displaces a disc valve member which seals against a frusto-conical housing seat spaced from the shoulder. A stack of Belleville-steel springs is between the disc member and the ring seal. An interface ring is between the springs and the ring seal. As the disc member is seated in its valve seat, a ring at the attachment member abuts the shoulder. The attachment member can no longer axially displace and compressively loads the springs as the disc member is further axially displaced to the valve closed state. The compressive load on the ring seal expands the seal radially outwardly against the housing bore and radially inwardly against the piston shank.

16 Claims, 5 Drawing Sheets

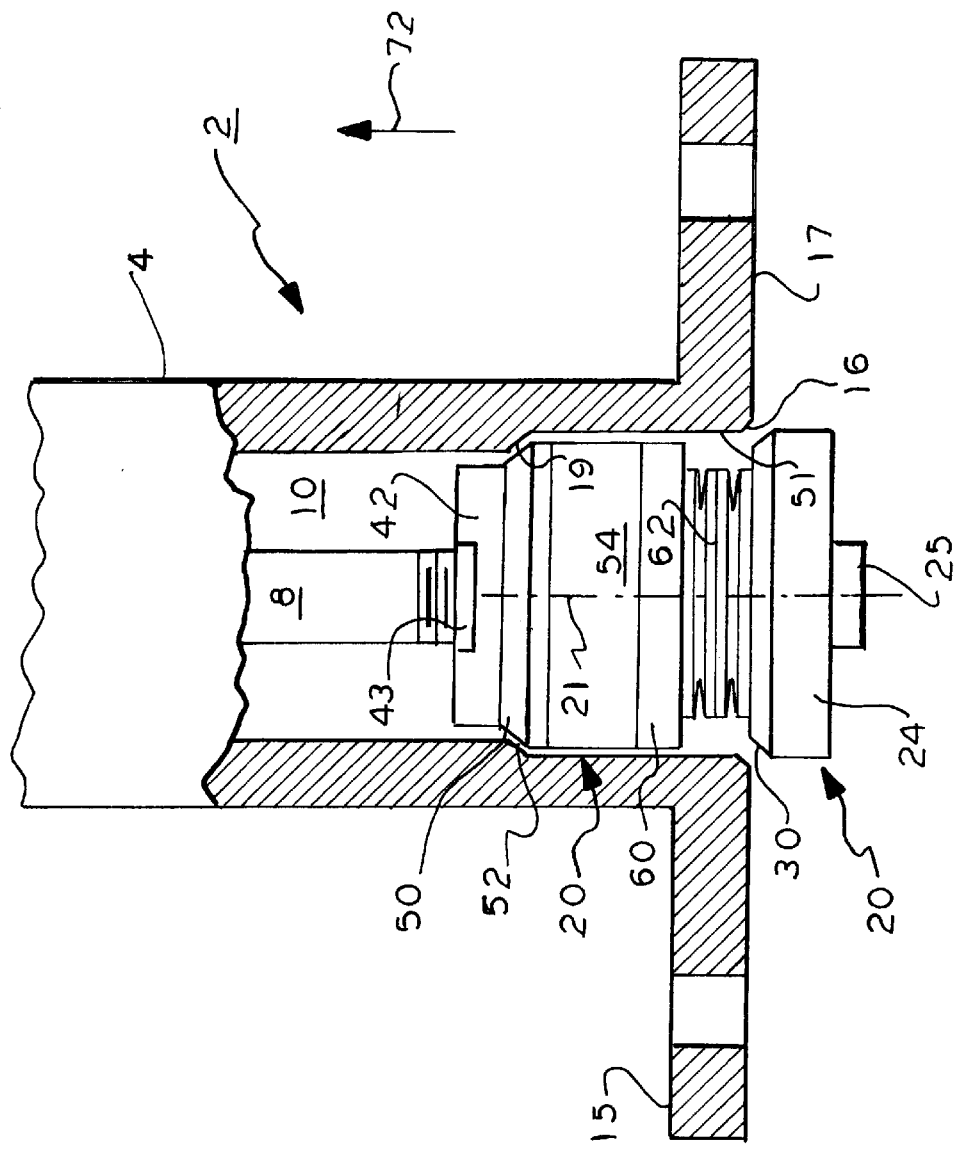

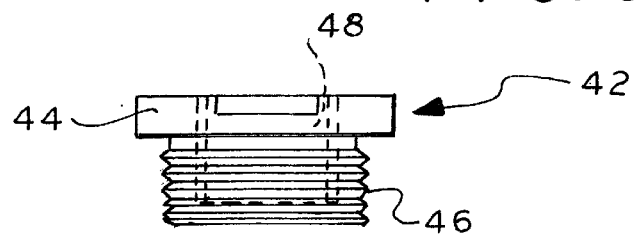
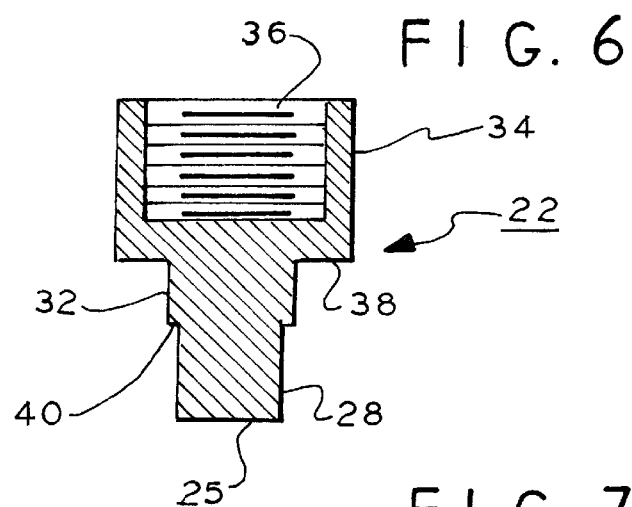
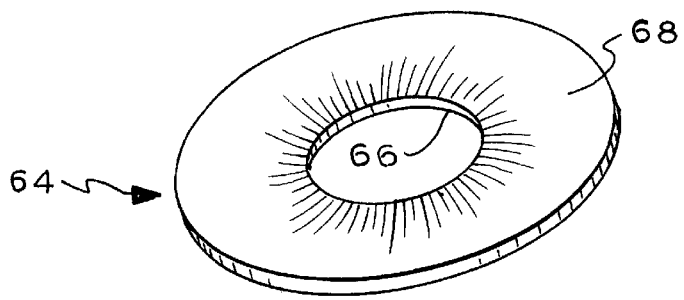
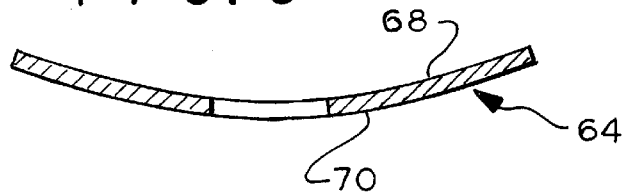

DISC VALVE ADAPTOR

This invention relates to a valve adaptor for a disc valve assembly to provide enhanced sealing action, and more particularly, to a rising disc valve or similar unit.

A rising disc valve assembly is commercially available and comprises a housing having a bore and a frusto-conical valve seat at one end of the bore. A handle is attached to a stem which is threaded to the housing bore for axially displacing the stem in the bore. A steel disc valve member with a frustoconical portion mates with and seats in the housing valve seat as the handle and stem are rotated. In the alternative, instead of a hard steel disc valve member the assembly may have what is referred to as a soft seal which may be thermoplastic material or other resilient material which engages a mating housing valve seat. However, in either.case, once the seal breaks down and leaks, the seal needs to be immediately replaced. The metal to metal disc seal tends to break down relatively quickly due to scratches and wear and so on. When the soft seal breaks down this seal also needs to be replaced at that time.

U.S. Pat. No. 2,918,078 discloses a valve having clamped valve member resilient insert and a resilient valve member seat insert. As the valve is closed one insert engages the other insert and the opposed sealing surfaces form an initial seal. Further movement of the valve member moves a pressure plate which engages projections and ribs which limit the downward movement. Further downward movement of the valve member body effects a further clamping of the valve member insert and expansion of the peripheral part thereof beyond the valve member body to increase the seal between the valve member insert and the valve seat insert.

U.S. Pat. No. 3,211,418 discloses a shut off valve comprising a spindle that can move a distance without displacing a piston coupled thereto. A nut is attached to the spindle for compressing a set of flat washer-like spring against a piston cap. The piston has a body that carries an elastically compressible sealing ring. The piston cap transmit pressure from the spring to the sealing ring. The sealing ring is constantly subject to axial elastic pressure of the springs. The outside surface of the sealing ring and piston body are a frustum of a cone and mate with a conical bore of the housing. Downward movement of the spindle seats the piston on the housing bore. Continued downward movement of the spindle causes it to displace relative to the piston body compressing the springs. This exerts a higher pressure on the sealing ring to more tightly seat it against the housing conical bore.

The springs thus urge both the sealing ring and the piston into sealing engagement by compression of the springs by the nut on the spindle as the spindle is moved downward relative to the piston. The spindle is otherwise loosely coupled to the sealing ring and piston and does not directly move the piston. Failure of the springs will release both the sealing ring and the piston from their sealed engagement with the housing bore. This is not desirable.

U.S. Pat. No. 2,574,054 discloses an aircraft brake system in which pressurized fluid is used to compress a compressible ring seal to provide sealing action.

The present inventor recognizes a need for a valve structure that solves the problems of the above and has longer life than the present seals described above. A need is seen for a fail safe valve that remains closed in case of valve failure. Further, a need is seen for a valve adaptor that is easily interchangeable and replaceable with the valve stem in the field to replace worn seals at relatively low cost.

A valve adaptor according to the present invention is for use with a disc valve arrangement including a housing having a valve seat in communication with a cylindrical bore in which a valve stem is located for axial displacement of the valve arrangement, the housing including first abutment means in the bore. The adaptor comprises a shank. A first relatively rigid incompressible valve member is secured to the shank for selectively engaging the valve seat to form a first seal in a closed state. A second resilient valve member is movably attached to the shank and has opposite sides for compressively distorting in response to an applied load to form a second seal with the bore. At least one resilient member is coupled to and between the first and second valve members. Second abutment means are on a side of the second valve member opposite the at least one resilient member for abutting the housing first abutment means and for limiting the displacement of the second valve member in the bore as the first valve member and shank are displaced to the closed state such that the displacement of the first valve member to the closed state displaces the first valve member relative to the second valve member and compresses the at least one resilient member to apply the load to the second valve member prior to the closing of the first valve member. An attachment member secures the shank to the stem.

In a further aspect, the at least one resilient member comprises at least one washer-like spring.

In a further aspect, the at least one resilient member comprises a stack of Belleville springs.

In a further aspect, the Belleville springs each comprise sheet steel having a convex outer surface and a complementary concave inner surface, the stack comprising a first spring having its concave surface facing in a direction toward the second valve member and a second spring having its concave surface facing in a direction toward the first valve member.

In a still further aspect, the adaptor:includes an interface member between the second valve member and the first spring, the first spring abutting the interface member and the interface member abutting the second valve member.

In a further aspect, the first valve member is steel and the second valve member is thermoplastic.

In a further aspect, the second valve member is polytetraflouride.

In a further aspect, the second valve member is a cylindrical ring.

In a further aspect, the attachment member is arranged for releasably engaging the stem and releasably securing the resilient member, and the first and second valve members thereto.

In a further aspect, the means for releasably securing includes a piston member secured to the first and second valve members, the second valve member for sealing engaging the piston member in response to the compressive distorting.

in a further aspect, a spring arrangement is coupled to the first and second valve members for providing the applied load in response to the selective engagement of the first valve member.

In a further aspect, the spring arrangement comprises a stack of Belleville springs coupled between the first and second valve members.

In a still further aspect, the Belleville springs each comprise sheet steel having a convex outer surface and a complementary concave inner surface, the stack comprising a first spring having its concave surface facing in a direction toward the second valve member and a second spring having its concave surface facing in a direction toward the first valve member.

In a further aspect, an interface member is between the second valve member and the first spring, the first spring abutting the interface member and the interface member abutting the second valve member.

In a still further aspect, the first valve member is steel and the second valve member is plastic and preferably the second valve member is Teflon, and more preferably, the second valve member is a cylindrical ring.

In a further aspect, an interface arrangement is for releasing engaging the stem and releasably securing the first and valve members thereto.

In a further aspect, the springs are arranged for displacing about 0.05 inches in response to about a one thousand pound load.

IN THE DRAWING

FIG. 1a is a fragmented side elevation view partially in section of the assembly of FIG. 1 in the open valve state;

FIG. 5 is a side elevation view of an adaptor for receiving the stem of the rising disc valve of FIG. 1;

FIG. 6 is a side elevation sectional view of a piston member of the adaptor assembly of FIGS. 1 and 2;

FIG. 7 is an isometric view of a representative Belleville spring used in the embodiment of FIGS. 1 and 2;

FIG. 8 is a side elevation sectional view of the spring of FIG. 7;

Figure 1:
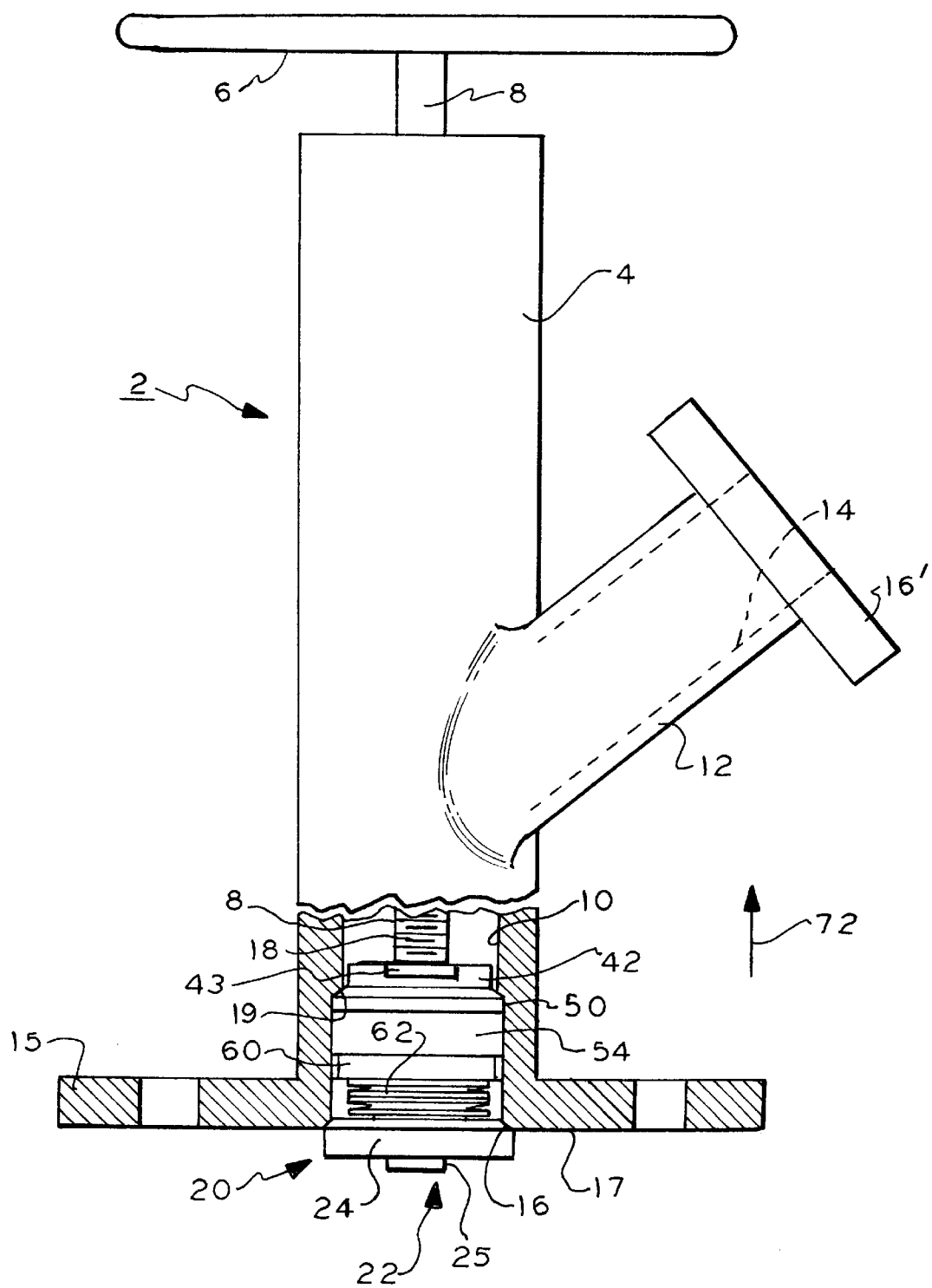
FIG. 1 is a side elevation view partially in section of a rising disc valve adaptor assembly in the closed valve state according to an embodiment of the present invention.
Figure 3:
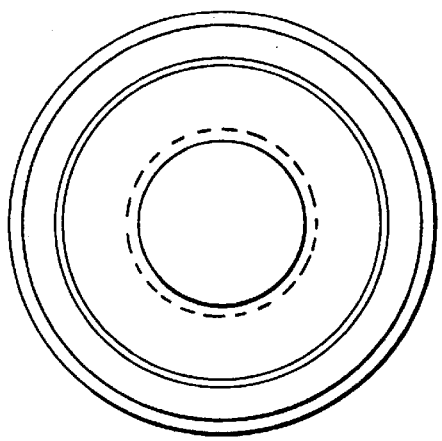
FIG. 3 is a top plan view of the adaptor assembly of FIG. 1 without the rising disc valve shown.
Figure 4:
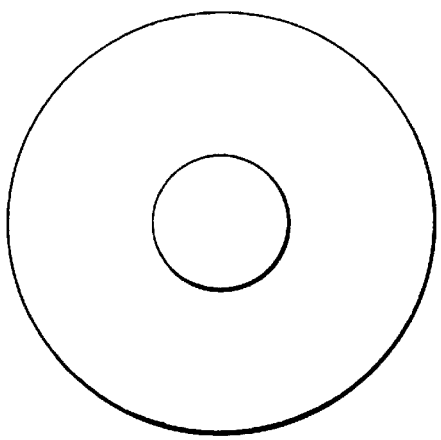
FIG. 4 is a bottom plan view of the adaptor assembly of FIG. 1 without the rising disc valve shown.
Figure 2:
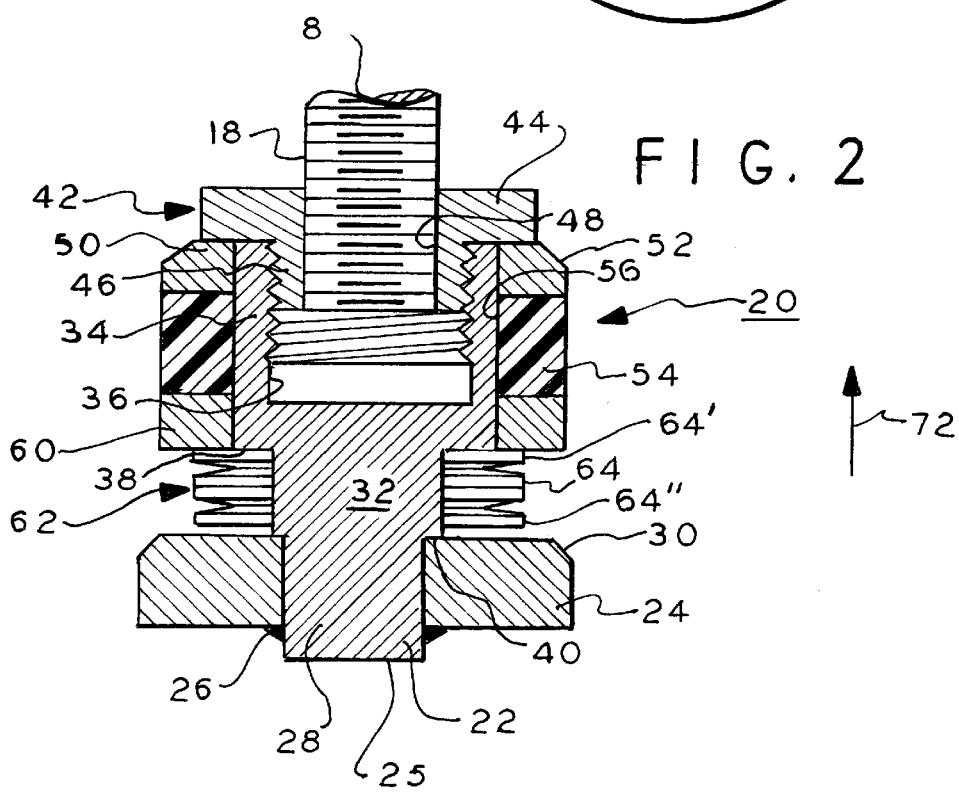
FIG. 2 is a sectional elevation view of the adaptor assembly of FIG. 1.
Figure 10:
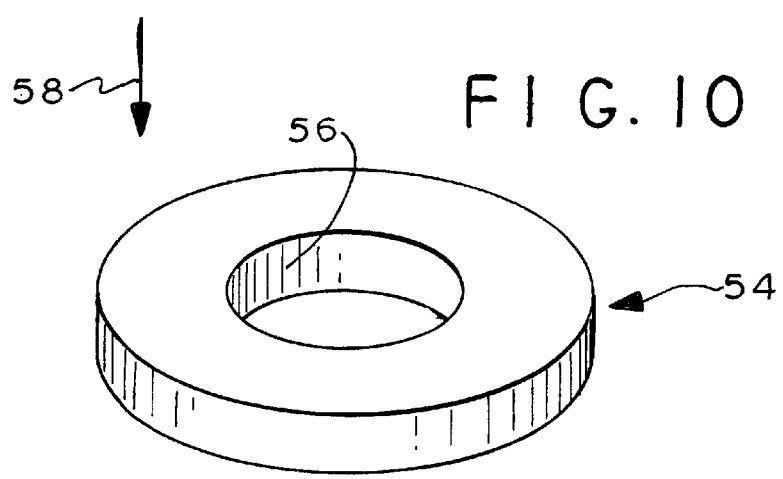
Figure 11:
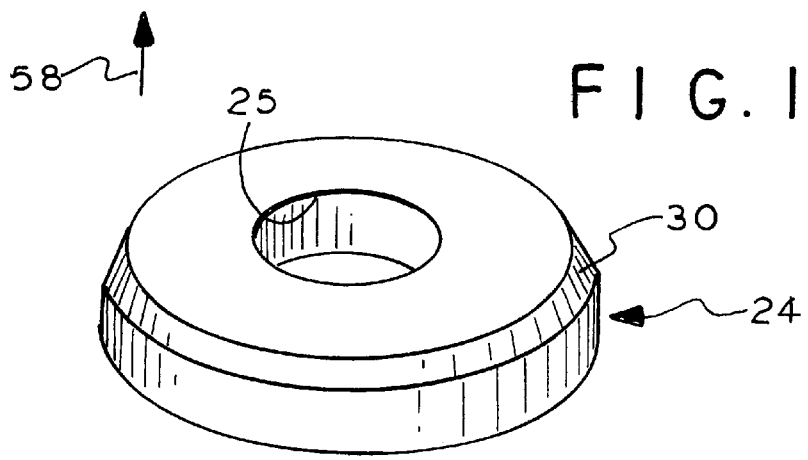

FIG. 10 is an isometric view of a relatively soft seal valve member used in the FIGS. 1 and 2 embodiment; and FIG. 11 is an isometric view of a relatively hard valve member used in the FIGS. 1 and 2 embodiment In FIG. 1, assembly 2 in the present embodiment comprises a conventional rising disc steel housing 4. A ring shaped handle 6 is attached to a stem 8, which is threaded to the housing 4 in a bore 10 by a screw thread arrangement (not shown). A hollow branch 12 has a fluid receiving bore 14 in communication with the bore 10. A flange 16' attaches fluid conduits (not shown) to the branch 12. The housing 4 has a flange 15 for attachment to other fluid conduits (not shown). The housing 4 has a frusto-conical valve seat 16 in communication with the bore 10. Seat 16 is formed in the outer surface 17 of the housing 4. The housing 4 has a chamfered shoulder 19 forming a first abutment element in the bore 10 axially spaced from the seat 16. The stem 8 has a threaded end 18.

Releasably attached to threaded stem end 18 is adaptor 20. In FIG. 2, the adaptor 20 comprises a stainless steel piston 22 forming a shank arrangement and a stainless steel valve disc member 24 welded to the piston 22 at annular weld 26. The disc member 24 has a bore 25 that closely receives the piston circular cylindrical shank 28. The disc member 24 has a frusto-conical outer valve surface 30 which sealingly selectively engages and mates with the housing 4 valve seat 16, FIG. 1.

In FIG. 6, the piston 22 has a second shank 32 of larger diameter than shank 28. An enlarged diameter portion 34 extends from the shank 32 and has a threaded bore 36. Portion 34 has a shoulder 38. The junction between shanks 28 and 32 forms a shoulder 40.

In FIGS. 2 and 5, the assembly 20 includes an attachment member 42 for releasably attaching the assembly 20 to the stem 8 threaded end 18. The member 42 has an enlarged diameter head 44 and a reduced diameter threaded extension 46. The member 42 head 44 has opposite flat portions 43 for attaching the member 42 to its mating components with a wrench. The member 42 has threaded bore 48 which mates with and releasably receives the threaded end 18 of the stem 8. The threaded extension mates with and is received in the piston 22 threaded bore 36.

The assembly 20, FIG. 2, includes a stainless steel compression ring 50 which has an annular frusto-conical chamfered surface 52 which assists in insertion of the assembly 20 into the housing bore 10 (FIG. 1). The surface 52 forming a second abutment element, which also selectively abuts the internal frusto-conical shoulder 19 in the bore 10 of the housing 4, FIG. 1. The abutment of the surface 52 against shoulder 19 limits further axial displacement of the ring 50 in direction 72. The ring 50 is a flat washer-like element with a central bore that receives the piston 22 shank portion 34 (FIG. 6). The ring 50 abuts the head 44 and the radial outer surface of the portion 34.

A plastic, preferably thermoplastic, and more preferably, a Teflon (polytetraflouride) sealing ring 54 is circular cylindrical and has a central through bore 56 (FIG. 10) that closely receives the piston shank 34. The ring 54 is compressible and radially inwardly and outwardly distorts under compressive axial loading in directions 58, FIG. 10. The sealing ring 54 abuts the compression ring 50, FIGS. 1 and 2.

Figure 9:
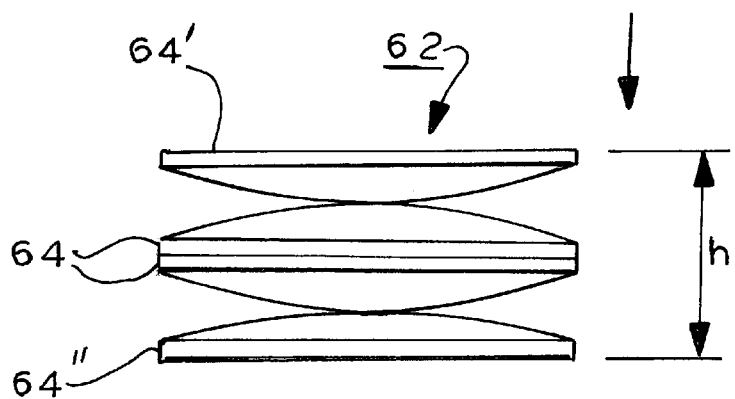
FIG. 9 is a more detailed side elevation view of the stack of Belleville springs used in the embodiment of FIGS. 1 and 2.

A stainless steel circular cylindrical spacer ring 60 closely receives the piston shank 34 in a ring 60 central bore and abuts the sealing ring 54. A stack 62 of four Belleville springs 64 is between the spacer ring 60 and disc member 24. In FIGS. 7–9, the Belleville springs 64 are sheet steel preferably about 1/16 inch thick in this embodiment, but may have other thicknesses according to a given implementation. The springs preferably have a diameter of about 1.50 inches and form a stack about 3/8 inches high, dimension h, FIG. 9. The springs 64 each have a central bore 66 with a diameter that closely receives the piston 22 shank 32 (FIG. 2). Each spring 64 is identical and the description of one is representative. The springs are similar to washers in that they comprise sheet metal elements with a central bore. However, while washers are flat, the springs are not flat but concave-convex, and generally can be referred to as spring washers. In FIGS. 7 and 8, spring 64 has a concave surface 68 and a convex complementary surface 70. These springs are commercially available from Key Bellevilles, Inc. Leechburg, Pa. and commonly referred to in industry as Belleville springs. The springs are made of various metal materials of high temperature, exhibit good strength and relaxation properties. These springs are described in detail in a catalog available from the manufacturer entitled Live Loading of Flange Stud Bolts and Live Loading of Valve Stem Packing Glands, Key Bellevilles, Inc. and also at a website www.keybellevilles.com.

In FIG. 9, the spring stack 62 comprises a top spring 64' and a bottom spring 64". Two intermediate springs 64, identical to springs 64' and 64", are between the top and bottom springs. The top spring concave surface faces the spacer ring 60, FIG. 2, and the bottom spring 64" concave surface faces the valve disc member 24. In FIG. 2, the bottom spring 64" abuts the disc member 24. The two intermediate springs 64, FIG. 9, abut each other with the concave surfaces facing each other and their respective convex surfaces facing and abutting the convex surfaces of the top and bottom springs 64' and 64", respectively. This arrangement of the springs maximizes the displacement for a given compression load on the springs. For a one thousand pound load the springs permit a displacement of the abutting parts of about 0.050 inches.

In operation, the adaptor 20, FIG. 1a, is assembled as described. The attachment member 42 is rotatably attached to the stem 8 end 18. The steel disc valve member 24 is spaced from the housing 4 seat 16, the chamfered surface 52 is spaced from the shoulder 19 and the valve is open. The shoulder 19 and surface 52 do not form a valve, but only serve to limit axial displacement of the ring 50 in direction 72.

The handle 6 (FIG. 1) is rotated in a direction to close the valve. During this rotation, the adaptor 20 is axially displaced in direction 72. During this displacement, the chamfered surface 52 on ring 50 abuts against the chamfered shoulder 19 of the housing limiting the displacement of the ring 50 in this direction. At this time, the disc member 24 is open because its frusto-conical valve surface 30 is spaced from seat 16 a greater distance than the axial spacing of surface 52 from the shoulder 19 in the direction 72 of axis 21. As the handle 6 is further rotated, the displacement of the stem 8 forces the ring 50 surface 52 against the shoulder 19. This force is axially applied in direction 72 by the disc 24 against the spring stack 62 and against the ring 60 and, thus, against the compressible member 54. Since the ring 50 is incompressible rigid steel and abuts the steel shoulder 19, the ring 50 cannot displace axially further, but is forced against the shoulder 19.

Further rotation of the handle further displaces the disc 24 in direction 72, compressing the springs 64 between the disc 24 and the now immobile ring 60 due to the immobility of the ring 50 and ring 54. This action applies a resilient axial load on the compressible sealing ring 54 via the springs 64 and intermediate spacer ring 60, e.g., up to about one thousand pounds. The compression ring 50 and the attachment member 42 head 44 (FIG. 2) are relatively incompressible. This axial load on the sealing ring 54 causes the sealing ring 54, due to its resiliency, to expand radially outwardly and to expand radially inwardly at the same time. This expansion action forces the sealing ring to sealingly expand against and engage both the bore 10 inner surface 51 of the housing 4 and the outer peripheral surface of the piston shank 34 (FIG. 2) surrounded by the sealing ring 54.

As the handle 6 is further rotated, the disc member 24 displaces further in direction 72 and eventually abuts and seals against the valve seat 16 in metal-to-metal sealing engagement. At this time the ring 54 is fully expanded to the desired amount to form the radially outward and inward seals of the adjacent bore and shank surfaces. Thus two axially spaced seals are provided by the disc 24 and by the ring 54. The ring 54 serves as a secondary backup seal for the less reliable metal-to-metal seal formed by the disc 24. Scratches and wear of the disc 24 may cause leaks relatively quickly after initial use. This in the past required immediate replacement of the disc 24. These frequent replacements are relatively costly.

With the secondary seal formed by ring 54, leaks are precluded for greater time periods as the ring 54 provides a more durable and longer life sealing action.

It is important that the springs 64 do not bottom out prior to the engagement of the disc member 24 with its seat 16, FIG. 1. If the springs 64 bottom out first, i.e., they are fully compressed, the disc member 24 will not be seated prior to the ring member 54 being fully expanded the desired amount and the sealing action between the disc member 24 and seat 16, FIG. 1, will not be complete. Thus, the disc member 24 will not provide a good seal.

The ring member 54 also provides a fail safe arrangement in combination with the metal-to-metal seal formed by the disc member 24. In case of fire or excessive high temperatures, the plastic seal ring 54 may fail. In the prior art, where only the plastic seal is provided, the entire valve assembly thus fails if the seal fails. However, the assembly 20 prevents such failure since the metal-to-metal seal of sealing disc member 24 will not be so affected by such conditions. Thus the combination of the two types of metal and compressible seals provides redundancy and enhanced sealing action not otherwise provided by the prior art single acting valve members.

Also, the metal-to-metal seal of disc member 24 provides a fail safe mode in case of failure of the spring stack 62. In this situation, the compression load on the compressible ring 54 will be lost and the sealing action of ring 54 may also be lost. However, the metal-to-metal contact of the disc member 24 with the valve seat 16 will remain in place regardless the failure condition of the spring stack and thus the seal integrity will remain unaffected by such spring failure.

As a result, a dual serially arranged valve is been provided that provides fail safe operation in case of damage to one of the seals during use or to the spring component of the valve assembly, the other seal permitting continued operation of the valve.

It will occur to one of ordinary skill in this art that still other various modifications may be made to the disclosed embodiment without departing from the spirit and scope of the invention. For example, threaded engagements may be replaced by bayonet fittings as applicable. The disc valve member 24 may be one piece with the piston. The number and dimensions of the springs may differ in different embodiments. Also the type of springs may also differ according to a given implementation. While Belleville springs are preferred still other spring types such as compression coil springs may be used as may be applicable. Also, the orientation of the stem 8 and attached valve disc member 24 may be reversed so that the stem is attached to the valve disc member at projection 25 on the disc member 24, FIGS. 1, 1a and 2, formed by the piston 22. That is the piston 22 may be attached to the stem 8 at projection 25 by a threaded coupling device (not shown). In this arrangement, the stem and housing corresponding to housing 4, extend downwardly in the drawing figures toward the bottom of the page. The endmost seal relative to the housing in this case is formed by ring 50 rather than disc member 24. The attachment member 42 is used to lock the ring 50 to the piston whereas a further attachment member (not shown) is threaded to the stem of such a reverse oriented stem. The operation, however, is the same as described above wherein the ring corresponding to ring 50 engages the mating housing seat first and the disc member corresponding to member 24 engages its seat second. The disclosed embodiment is for illustration and not limitation. The invention is defined by the appended claims.

What is claimed is:

1. A valve adaptor for use with a disc valve arrangement including a housing having a valve seat in communication with a cylindrical bore in which a valve stem is located for axial displacement of the valve arrangement, the housing including a first abutment element in the bore, the adaptor comprising:

a shank;

a first relatively rigid incompressible valve member secured to the shank for selectively engaging the valve seat to form a first seal in a closed state;

a second resilient valve member movably attached to the shank and having opposite sides for compressively distorting in response to an applied load to form a second seal with said bore;

at least one resilient member coupled to and between the first and second valve members;

a second abutment element on a side of the second valve member opposite the at least one resilient member for abutting the housing first abutment element and for limiting the displacement of the second valve member in the bore as the first valve member and shank are displaced to the closed state such that the displacement of the first valve member to the closed state displaces the first valve member relative to the second valve member and compresses said at least one resilient member to apply said load to the second valve member prior to the closing of the first valve member; and an attachment member for securing the shank to the stem.

2. The adaptor of claim 1 wherein the attachment member is releasably attached to the shank, the second valve member for sealing engaging the shank in response to the compressive distorting.

3. The adaptor of claim 1 wherein the at least one resilient member comprises at least one washer-like spring.

4. The adaptor of claim 3 wherein the at least one resilient member comprises a stack of Belleville springs.

5. The adaptor of claim 4 wherein the Belleville springs each comprise sheet steel having a convex outer surface and a complementary concave inner surface, the stack comprising a first spring having its concave surface facing in a direction toward the second valve member and a second spring having its concave surface facing in a direction toward the first valve member.

6. The adaptor of claim 5 including an interface member between the second valve member and the first spring, the first spring abutting the interface member and the interface member abutting the second valve member.

7. The adaptor of claim 1 wherein the first valve member is steel and the second valve member is thermoplastic.

8. The adaptor of claim 7 wherein the second valve member is polytetraflouride.

9. The adaptor of claim 1 wherein the second valve member is a cylindrical ring.

10. The adaptor of claim 1 wherein the attachment member is arranged for releasably engaging the stem and releasably securing the resilient member and the first and second valve members thereto.

11. A valve adaptor for a valve assembly having a valve stem for opening and closing a valve, the stem located in a housing having bore, an abutment element in the bore and a valve seat for the valve, the adaptor comprising:

a shank for attachment to the valve stem;

a valve disc with a frusto-conical valve surface attached to the shank for sealingly mating with the valve seat;

at least one spring member having opposite first and second sides and attached to the shank abutting the valve disc at the spring member first side;

an annular incompressible compression member for abutting said abutment element; and an annular compressible valve member for engaging the bore and the shank for forming a seal with the housing bore and with the shank, the annular compressible valve member being between the incompressible compression member and the at least one spring member, said compressible valve member for distorting and sealing to the shank and housing bore in response to and prior to the steel disc mating and sealing to the housing valve seat.

12. The adaptor of claim 11 including an intermediate member secured to the shank and abutting the at least one spring member second side and the compressible valve member.

13. The adaptor of claim 12 wherein the intermediate member is a rigid metal ring.

14. The adaptor of claim 12 wherein the compression member is a rigid ring, the abutment element and rigid ring having mating chamfered surfaces.

15. The adaptor of claim 11 wherein the at least one spring member comprises a stack of convex-concave washer-like members.

16. A valve adaptor for a valve assembly having a valve stem for opening and closing a valve, the stem located in a housing having bore, abutment elements in the bore and a valve seat for the valve, the adaptor comprising:

a piston member having a shank;

an attachment member for releasably attaching the piston member at a first end thereof to the stem;

a rigid valve disc member fixedly attached to the shank at a second piston end opposite the first end for sealing engagement with the valve seat;

a first ring adjacent to the attachment member movably receiving the shank therethrough and for abutting the abutment element to limit the axial displacement of the first ring in said bore;

a compressible resilient ring secured adjacent to the first ring about the shank for selectively forming a seal with said bore and with said shank;

a compression member secured about the shank and abutting the resilient ring on a side opposite the first ring; and a resilient compressible spring abutting the compression member and the disc, the disc and attachment member releasably capturing the first ring, the resilient ring, the compression member, the spring therebetween.

* * * * *